(12) United States Patent
Wan et al.

(10) Patent No.: US 12,444,120 B2
(45) Date of Patent: Oct. 14, 2025

(54) RENDERING SYSTEM AND METHOD BASED ON SYSTEM-ON-CHIP (SOC) PLATFORM

(71) Applicant: Nanjing SemiDrive Technology LTD., Nanjing (CN)

(72) Inventors: Peng Wan, Nanjing (CN); Lili Dai, Nanjing (CN)

(73) Assignee: Nanjing SemiDrive Technology LTD., Nanjing (CN)

( * ) Notice: Subject to any disclaimer, the term of this patent is extended or adjusted under 35 U.S.C. 154(b) by 244 days.

(21) Appl. No.: 18/159,880

(22) Filed: Jan. 26, 2023

(65) Prior Publication Data
US 2024/0029335 A1 Jan. 25, 2024

(30) Foreign Application Priority Data
Jul. 20, 2022 (CN) .......................... 202210853087.1

(51) Int. Cl.
G06T 15/00 (2011.01)
G06F 15/173 (2006.01)
G06F 15/78 (2006.01)

(52) U.S. Cl.
CPC ...... *G06T 15/005* (2013.01); *G06F 15/17325* (2013.01); *G06F 15/7814* (2013.01)

(58) Field of Classification Search
CPC ... G06T 15/005; G06T 1/20; G06F 15/17325; G06F 15/7814; G06F 15/167; G06F 15/7807; Y02D 10/00
See application file for complete search history.

(56) References Cited

U.S. PATENT DOCUMENTS

| | | | | |
|---|---|---|---|---|
| 2002/0118199 A1* | 8/2002 | Mukherjee | ............ | G06F 3/1438 713/400 |
| 2015/0145873 A1* | 5/2015 | Akenine-Moller | ..... | G06T 11/40 345/506 |

(Continued)

FOREIGN PATENT DOCUMENTS

| | | | | | |
|---|---|---|---|---|---|
| CN | 114579072 A | * | 6/2022 | ........... | G06F 3/1423 |
| WO | 2020190432 A1 | | 9/2020 | | |
| WO | WO 2020/190432 | * | 9/2020 | ............... | G06T 1/20 |

OTHER PUBLICATIONS

QNX Hypervisor 2.0 Automotive, BlackBerry (Year: 2018).*

(Continued)

*Primary Examiner* — Daniel F Hajnik
*Assistant Examiner* — Adeel Bashir
(74) *Attorney, Agent, or Firm* — ANOVA LAW GROUP, PLLC (57) ABSTRACT

A rendering system based on a system-on-chip (SOC) platform includes a plurality of processors, a plurality of graphic processors, an inter-core communication circuit, and the shared memory. The plurality of processors are divided into more than two processor groups. The plurality of operating systems are run by a plurality of different processor groups. A plurality of graphics processors receive a rendering tasks sent by the plurality of operating systems, respectively. An inter-core communication circuit is configured to cause the plurality of processors of the plurality of processor groups to communicate with each other. The plurality of graphics processors read image data in the shared memory, and rendered image data is transmitted to the shared memory.

10 Claims, 3 Drawing Sheets

(56) References Cited

U.S. PATENT DOCUMENTS

| | | | |
|---|---|---|---|
| 2016/0275915 A1* | 9/2016 | Smyth | G06F 9/4881 |
| 2017/0123849 A1* | 5/2017 | Tian | G06F 9/455 |
| 2019/0206023 A1* | 7/2019 | Dimitrov | G06T 15/005 |
| 2022/0222768 A1* | 7/2022 | Strauss | G06F 9/4881 |
| 2023/0024607 A1* | 1/2023 | Choi | G06F 15/7807 |

OTHER PUBLICATIONS

QNX Hypervisor 2.0 Embedded Systems, BlackBerry (Year: 2019).*
The European Patent Office (EPO) The Extended European Search Report for 23164360.2, Dec. 21, 2023 12 Pages.

* cited by examiner

RENDERING SYSTEM AND METHOD BASED ON SYSTEM-ON-CHIP (SOC) PLATFORM

CROSS-REFERENCE TO RELATED APPLICATION

The present disclosure claims priority to Chinese Patent Application No. 202210853087.1, filed on Jul. 20, 2022, the entire content of which is incorporated herein by reference.

TECHNICAL FIELD

The present disclosure generally relates to the computer graphic field and, more particularly, to a rendering system and method based on a system-on-chip (SOC) platform.

BACKGROUND

With increasing demands from a market, for example, in automotive electronics, increasingly complex systems on chip (SOCs) are developed in the semiconductor technology due to demands for multimedia, connectivity, navigation, instrumentation, etc. A SOC is integrated with different processor cores and a plurality of different GPU resources to meet computing power requirements in a complex rendering scenario.

Currently, a multi-core heterogeneous system generally is configured to perform a rendering task by running a single system and a single GPU. However, the existing method often do not make good use of internal resources of a chip to realize collaborative rendering between multiple systems and multiple GPUs. Meanwhile, resource allocation processing is also not flexible for a simple or complex rendering scenario.

SUMMARY

Embodiments of the present disclosure provide a rendering system and method based on a system-on-chip (SOC) platform, which can maximize the rendering efficiency and ensure the drawing robustness of the system for an operating environment with a plurality of graphics processor units (GPUs) and a plurality of operating systems on a multi-core heterogeneous chip.

Embodiments of the present disclosure provide a rendering system based on an SOC platform, including a plurality of processors, a plurality of graphics processors, an inter-core communication circuit, and a shared memory. The plurality of processors are divided into more than two processor groups. A plurality of operating systems are run by a plurality of different processor groups. The plurality of graphics processors receive rendering tasks sent by the plurality of operating systems, respectively. The inter-core communication circuit is configured to cause the plurality of processors of the plurality of processor groups to communicate with each other. The plurality of graphics processors read image data in the shared memory, and rendered image data is transmitted to the shared memory. In response to a rendering task being distributed to the plurality of processor groups by the inter-core communication circuit, the plurality of graphics processors corresponding to the plurality of processor groups read the image data corresponding to the rendering task in the shared memory and perform collaborative rendering.

Embodiments of the present disclosure provide a rendering method based on a system-on-chip (SOC) platform. The method includes determining whether a plurality of processors are needed to perform rendering synchronically. The plurality of processors are divided into two or more processor groups. A plurality of operating systems are run by the plurality of different processors, respectively. The method further includes determining a plurality of graphics processors that perform the rendering synchronically through an inter-core communication. The plurality of graphics processors are in a one-to-one correspondence with the processor groups. The method further includes integrating a result after collaborative rendering and outputting the result.

Embodiments of the present disclosure provide a non-transitory computer-readable storage medium. The storage medium stores a computer instruction and, when the computer instruction is executed, a processor is caused to determine whether a plurality of processors are needed to perform rendering synchronically. The plurality of processors are divided into two or more processor groups. A plurality of operating systems are run by the plurality of different processors, respectively. The processor is further configured to determine a plurality of graphics processors that perform the rendering synchronically through an inter-core communication. The plurality of graphics processors are in a one-to-one correspondence with the processor groups. The processor is further configured to integrate a result after collaborative rendering and outputting the result.

In the rendering system and method based on the SOC platform of the present disclosure, the graphics processor of the one of the plurality of processor groups and the graphics processor of the one of the other processor groups can perform the collaborative rendering to support the plurality of graphics processors to perform the collaborative rendering on the SOC platform with the plurality of operating systems. Thus, the rendering efficiency can be maximized, and the drawing robustness of the graphics processor can be ensured.

Other features and advantages of the present disclosure are described in the description below. Some of the features and advantages become apparent in the description or may be learned by implementing the disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Embodiments of the present disclosure are described in detail below with reference to the accompanying drawings.

Although the drawings show certain embodiments of the present disclosure, however, the present disclosure can be implemented in various forms and should not be limited to the embodiments described here. These embodiments are provided for a more thorough and complete understanding of the present disclosure. The drawings and embodiments of the present disclosure are exemplary and are not used to limit the scope of the present disclosure.

Various steps described in method embodiments of the present disclosure can be performed in different orders and/or in parallel. In addition, method embodiments can include additional steps and/or steps that are omitted for performing the illustration. The scope of the present disclosure is not limited to this aspect.

The term "including" and variations thereof as used herein are open-ended inclusions, i.e., "including but not limited to." The term "according to" means "at least partially according to." Relevant definitions of other terms are given in the description below.

The modification of "one" and "a plurality of" mentioned in the present disclosure is illustrative rather than restrictive. Those skilled in the art should understand that unless otherwise clearly indicated in the context, "one" should be understood as "one or more," and "a plurality of" should be understood as two or more.

Embodiments of the present disclosure will be described in detail with reference to the accompanying drawings below.

Figure 1:
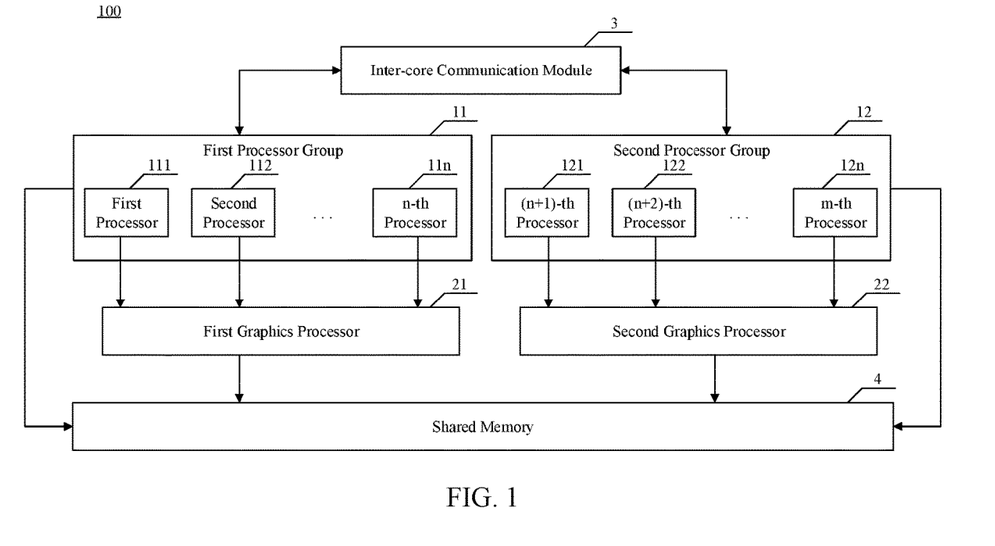
FIG. 1 illustrates a schematic structural diagram of a rendering system based on a system-on-chip (SOC) platform according to some embodiments of the present disclosure.

FIG. 1 illustrates a schematic structural diagram of a rendering system 100 based on a system-on-chip (SOC) platform according to some embodiments of the present disclosure. As shown in FIG. 1, the rendering system 100 based on the SOC platform includes a first processor group 11 formed by a plurality of processors (a first processor 111, a second processor 112, an nth processor 11n, etc.), a second processor group 12 formed by a plurality of processors (n+1th processor 121, n+2th processor 122, mth processor 12n, etc.), a first graphics processor 21 corresponding to the first processor group 11, a second graphics processor 22 corresponding to the second processor group 12, an inter-core communication module 3 configured to cause the processors of the first processor group 11 and the processors of the second processor group 12 to communicate with each other, and a memory 4 connected to and shared by the first processor group 11, the second processor group 12, the first graphics processor 21, and the second graphics processor 22.

A plurality of operating systems can run in a plurality of different processor groups, respectively. For example, a first operating system can run in the first processor group 11, and a second operating system can run in the second processor group 12.

In some embodiments, as an example, the processor can be virtualized as at least two virtual processing cores that are isolated from each other in time based on real hardware. The virtual processing cores can run different operating systems. An inter-core communication technology can be inter-core communication technology based on virtualization.

In some embodiments, as another example, the processor can include at least two real processing cores isolated from each other in space. The real processing cores can run different operating systems, respectively. The inter-core communication technology can be inter-core communication based on a multi-core structure.

The first graphics processor 21 can receive a rendering task sent by the first operating system that runs in the first processor group 11 and perform rendering. On another aspect, the second graphics processor 22 can receive a rendering task sent by a second operating system that runs in the second processor group 12. The first graphics processor 21 and the second graphics processor 22 can read image data in the shared memory 4 and send the rendered image data to the shared memory 4.

For example, the first operating system can determine whether the single first graphics processor 12 of the first processor group 11 is used to perform the rendering task based on a scene complexity of the rendering task, or whether the first graphics processor 21 and the second graphic processor 22 (a plurality of graphics processors) of the first processor group 11 and second processor group 12 (a plurality of processor groups) are configured to perform collaboratively the rendering task.

When the first operating system determines that the first graphics processor 21 corresponding to the first processor group 11 and the second graphics processor 22 corresponding to the second processor group 12 need to perform collaboratively the same rendering task, the first processor group 11 can notify the second processor group 12 through an inter-core communication mechanism of an inter-core communication module 3. Then, after the second graphics processor 22 receives the rendering task that needs to be performed collaboratively, the second image processor 22 can read the image data in the shared memory 4 to perform rendering. That is, the second processor group 12 can open up a rendering task thread to complete the rendering task that needs to be performed collaboratively. In collaborative rendering, the rendering between the first processor group 11 and the second processor group 12 can be synchronized through the inter-core communication. A rendering result can be output to the first graphics processor 21 corresponding to the first processor group 11 through the shared memory 4 as an output of the first graphics processor 21. Then, a drawing result can be output by the first graphics processor 21.

For another example, when any one of the first processor group 11 and the second processor group 12 (for example, the first processor group 11) is abnormal, feedback can be provided to the other processor group (e.g., the second processor group 12) that runs normally through the inter-ore communication module 3. The drawing task can be performed by the graphics processor (e.g., the second graphics processor 22) corresponding to the processor group that runs normally. The final result can be output by the second graphics processor 22.

According to the rendering system based on the SOC platform of embodiments of the present disclosure, the first graphics processor 21 corresponding to the first processor group 11 and the second graphics processor 22 corresponding to the second processor group 12 can perform rendering collaboratively to support the plurality of graphics processors to perform rendering collaboratively at the SOC platform with a plurality of operating systems. Thus, rendering efficiency can be maximized, and the robustness of the drawing of the graphics processor can be ensured.

According to the rendering system based on the SOC platform of embodiments of the present disclosure, when the first processor group 11 is abnormal, feedback can be provided to the second processor group 12 through the inter-core communication module 3. Thus, the second processor group 12 can perform rendering. Thus, when a single system is abnormal to cause the graphics processor to be not able to perform drawing, the graphics processor of the other system can still perform drawing normally. Thus, the drawing robustness of the graphic processor can be ensured.

According to the rendering system based on the SOC platform of embodiments of the present disclosure, through a flexible configuration of software, the plurality of graphics processors can be distributed to the plurality of systems to run and perform collaboratively the rendering task. The plurality of graphics processors can perform the rendering independently and output the result to different hardware displays and can also perform the rendering collaboratively and output the result to a same display.

In embodiments of the present disclosure, an example including two processor groups is described. However, a quantity of the processor groups is not limited to this and can be two or more. In addition, in embodiments of the present disclosure, an example in which each processor group includes a plurality of processors is described. However, a quantity of processors in each processor group is not limited to this and can be one.

In addition, in embodiments of the present disclosure, an example including the shared memory is described. However, each processor group can have an independent memory, respectively.

Figure 2:
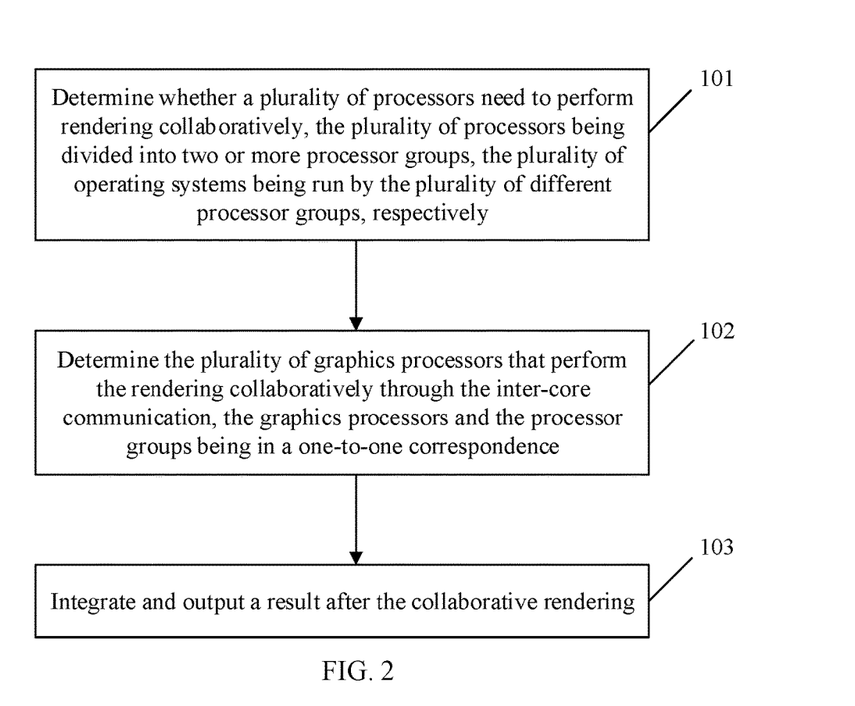
FIG. 2 illustrates a schematic flowchart of a rending method based on the SOC platform according to some embodiments of the present disclosure.

FIG. 2 illustrates a schematic flowchart of a rending method based on the SOC platform according to some embodiments of the present disclosure. As shown in FIG. 2, the rendering method based on the SOC platform is described in detail.

At 101, whether a plurality of processors need to perform rendering collaboratively is determined. The plurality of processors are divided into two or more processor groups. The plurality of operating systems are run by the plurality of different processor groups, respectively. In step 101, a processor of the plurality of processor groups determines whether processors of other processor groups need to perform rendering collaboratively. Whether the rendering task is performed by one processor of the plurality of processor groups or whether the rendering task is performed by the plurality of processor groups collaboratively can be determined according to the complexity of the scenario of the rendering task. Rendering collaboratively can mean that the graphics processors corresponding to the plurality of processor groups perform the same rendering together. For example, as shown in FIG. 1, the first graphics processor corresponding to the first processor group performs a part of the rendering task, and the second graphics processor corresponding to the second processor group performs the rest of the rendering task.

At 102, the plurality of graphics processors that perform the rendering collaboratively are determined through the inter-core communication. The graphics processors and the processor groups are in a one-to-one correspondence. In step 102, when collaborative rendering is required, the processors in other processor groups can be notified through the inter-core communication, otherwise only the graphics processor corresponding to one of the plurality of processor groups can perform the rendering. Other processor groups can determine whether a graphics processor that corresponds to the one of the other processor groups can be used. When the graphic processor corresponding to the one of the other processor groups that can be used is determined, the graphics processor corresponding to the one of the plurality of processor groups and the graphics processor corresponding to one of other processor groups can perform the rendering collaboratively, otherwise only the graphics processor corresponding to the one of the plurality of processor groups can perform the rendering. The one of the plurality of processor groups can divide a rendering area into a plurality of sub-areas. Rendering ability of the graphics processor corresponding to the one of the plurality of processor groups can use some sub-areas as the collaborative rendering task that is performed by the other processor groups. Then, the one of the plurality of processor groups can send related information of the collaborative rendering task to the other processor groups through the inter-core communication. The graphics processor corresponding to the one of the other processor groups can read the related information from the shared memory according to the received related information and perform the rendering on some sub-areas. The related information of the collaborative rendering task can include corresponding image data, address, etc. In addition, a task distribution method between the plurality of processor groups is not limited to this.

In embodiments of the present disclosure, during the collaborative rendering process, the synchronization of the graphics processor of the one of the plurality of processor groups and the graphics processor corresponding to the other processor groups can be ensured.

At 103, a result after the collaborative rendering is integrated and output. In step 103, after the synchronous rendering is completed, the other processor groups can notify one of the plurality of processor groups through the inter-core communication. The final rendering can be performed by the one of the plurality of processor groups and output the final rendering result.

Figure 3:
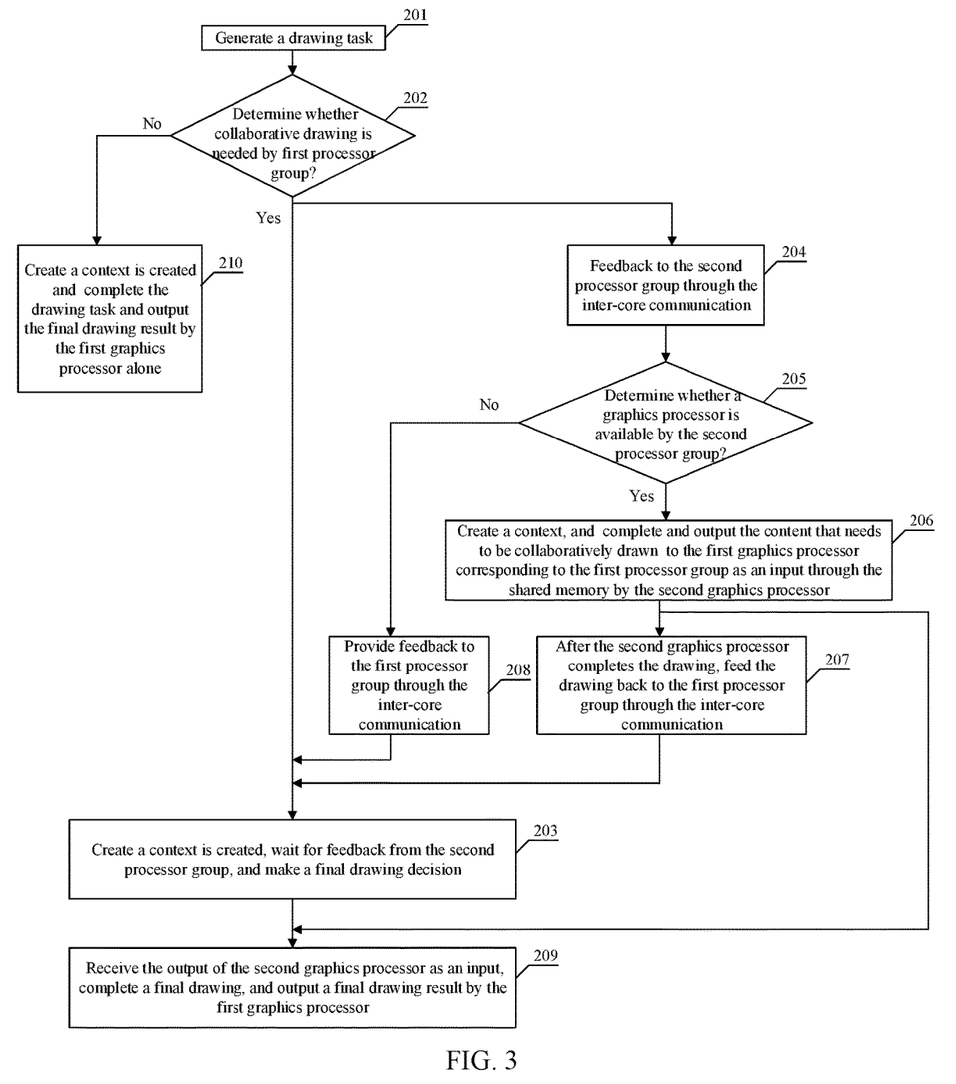
FIG. 3 illustrates a schematic flowchart showing an implementation of a rending method based on the SOC platform according to some embodiments of the present disclosure.

With reference to FIG. 1 and FIG. 3, an implementation in which the first processor group requires the second processor group to perform the collaborative rendering task is described below. FIG. 3 illustrates a schematic flowchart showing the implementation of the rending method based on the SOC platform according to some embodiments of the present disclosure. The collaborative rendering is described as an example of collaborative drawing.

As shown in FIG. 3, at 201, a first system run by the first processor group generates a rendering task.

At 202, the first processor group determines whether collaborative drawing is required, and when the first processor group determines that the collaborative drawing is required, a next step (step 203 and step 204) is performed, otherwise, step 210 is performed.

At 203, a context is created, and the first processor group waits for feedback from the second processor group and makes a final drawing decision.

At 204, the first processor group feeds back to the second processor group through the inter-core communication.

At 205, the second processor group determines whether a graphics processor is available, and if the second processor group determines that a second graphics processor corresponding to the second processor group is available, a next step is performed, otherwise step 208 is performed.

At 206, a context is created, and the second graphics processor completes the content that needs to be collaboratively drawn and outputs to the first graphics processor corresponding to the first processor group as an input through the shared memory.

At 207, after the second graphics processor completes the drawing, the drawing can be feedback to the first processor group through the inter-core communication.

At 208, feedback is provided to the first processor group through the inter-core communication.

At 209, the first graphics processor receives the output of the second graphics processor as an input, completes a final drawing, and outputs a final drawing result.

At 210, a context is created, and the first graphics processor individually completes the drawing task and outputs the final drawing result.

Figure 4:
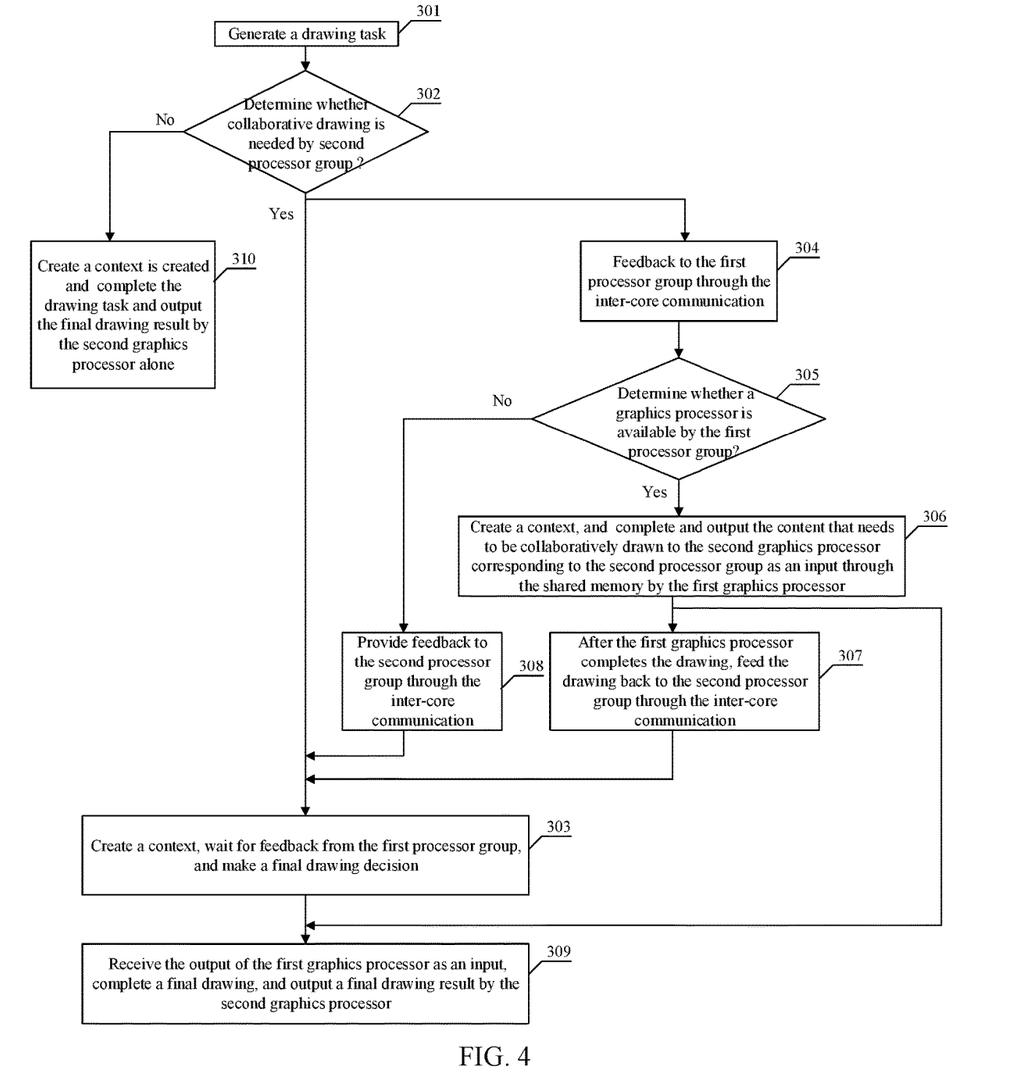
FIG. 4 illustrates a schematic flowchart showing another implementation of a rending method based on the SOC platform according to some embodiments of the present disclosure.

With reference to FIG. 1 and FIG. 4, another implementation in which the second processor group requires the first processor group to perform the collaborative rendering task is described below. FIG. 4 illustrates a schematic flowchart showing another implementation of the rending method based on the SOC platform according to some embodiments of the present disclosure. The collaborative rendering is described as an example of collaborative drawing.

As shown in FIG. 4, at 301, a second system run by a second processor group generates a rendering task.

At 302, the second processor group determines whether the collaborative drawing is required, and when the second processor group determines that the collaborative drawing is required, a next step (step 303 and step 304) is performed, otherwise step 310 is performed.

At 303, a context is created, and the second processor group waits for the feedback from the first processor group and makes a final drawing decision.

At 304, the second processor group feeds back to the first processor group through the inter-core communication.

At 305, the first processor group determines whether a graphics processor is available, and when the first processor group determines that the first graphics processor corresponding to the first processor group is available, a next step is performed, otherwise, step 308 is performed.

At 306, a context is created, and the first graphics processor completes the content that needs to be drawn collaboratively and outputs the content to the second graphics processor corresponding to the second processor group as an input through the shared memory.

At 307, after the first graphics processor completes the drawing, the drawing is fed back to the second processor group through the inter-core communication.

At 308, the drawing is fed back to the second processor group through the inter-core communication.

At 309, the second graphics processor receives the output of the first graphics processor as an input, and the second graphics processor completes the final drawing and outputs the final drawing result.

At 310, a context is created, and the second graphics processor completes the rendering task and outputs the final rendering result alone.

According to the rendering method based on the SOC platform of embodiments of the present disclosure, the graphics processor corresponding to the one of the multiple processor groups and the graphics processor corresponding to one of the other processor groups can perform collaborative rendering to support the plurality of graphics processors to perform the collaborative rendering at the SOC system with the plurality of operating systems. Thus, the rendering efficiency can be maximized, and the drawing robustness of the graphics processor can be ensured.

According to the rendering method based on the SOC platform of embodiments of the present disclosure, when one of the plurality of processor groups is abnormal, feedback can be provided to the other processor groups through the inter-core communication to cause the other processor groups to perform the rendering. Thus, when a single system is abnormal to cause the graphics processor to be not able to perform the drawing, the graphics processor in another system can still perform the drawing normally. Thus, the drawing robustness of the graphics processor can be ensured.

According to the rendering method based on the SOC platform of embodiments of the present disclosure, through the flexible configuration of the software, the plurality of graphics processors can be distributed to the plurality of systems to run and complete collaboratively the rendering task. Thus, the plurality of graphics processors can perform rendering independently and output to different hardware displays or perform the rendering collaboratively and output to the same display.

In some other embodiments, a vehicle chip can be also provided and include the rendering system based on the SOC platform of the present disclosure.

In some other embodiments, an electronic device can be also provided and include the vehicle chip of the present disclosure.

In some other embodiments, a computer-readable storage medium can be also provided and store a computer instruction. When the computer instruction is executed, the rendering method based on the SOC platform of the present disclosure can be executed.

Those of ordinary skill in the art should understand that the above is only some embodiments of the present disclosure and does not limit the present disclosure. Although the present disclosure is described in detail with reference to embodiments of the present disclosure, modifications can be made to the technical solution of embodiments of the present disclosure, or equivalent replacement can be made to some technical features. Any modification, equivalent replacement, and advancement made with in the spirit and principle of the present disclosure should be included in the scope of the present disclosure.

What is claimed is:

1. A rendering system based on a system-on-chip (SOC) platform comprising:
a plurality of processors divided into a plurality of processor groups, a plurality of operating systems being run by the plurality of processor groups, different processor groups in the plurality of processor groups not sharing an operating system;
a plurality of graphics processors receiving rendering tasks sent by the plurality of operating systems, respectively, the plurality of graphics processors being in a one-to-one correspondence with the plurality of processor groups;
an inter-core communication circuit configured to cause the plurality of processors of the plurality of processor groups to communicate with each other; and
a shared memory, the plurality of graphics processors reading image data in the shared memory, and rendered image data being transmitted to the shared memory;
wherein:
in response to a rendering task being distributed to the plurality of processor groups by the inter-core communication circuit, the plurality of graphics processors corresponding to the plurality of processor groups read the image data corresponding to the rendering task in the shared memory and perform collaborative rendering, and
wherein a processor of one of the plurality of processor groups is configured to:
determine whether the plurality of processors are needed to perform rendering collaboratively;
determine the plurality of graphics processors that perform the rendering collaboratively through the inter-core communication circuit; and
integrate a result after the collaborative rendering and outputting the result,
wherein determining whether the plurality of processors are needed to perform the rendering collaboratively further includes:

determining whether processors of other processor groups of the plurality of processor groups are needed to perform the rendering collaboratively, whether the one of the plurality of processor groups performs the rendering task or the plurality of processor groups perform the rendering task collaboratively being determined according to complexity of a scenario of the rendering task, and wherein determining the plurality of graphics processors that perform the rendering collaboratively through the inter-core communication circuit further includes:

in response to determining that the collaborative rendering is needed, notifying the processors of the other processor groups of the plurality of processor groups through the inter-core communication circuit, otherwise a graphics processor corresponding to the one of the plurality of processor groups performs the rendering alone;

determining, by the other processor groups, whether a graphics processor corresponding to one of the other processor groups is available; and in response to determining that the graphics processor corresponding to the one of the other processor groups is available, performing the collaborative rendering by the graphics processor corresponding to the one of the plurality of processor groups and the graphics processor corresponding to the one of the other processor groups, otherwise the graphics processor corresponding to the one of the plurality of processor groups performs the rendering alone.

2. The system according to claim 1, wherein:

the plurality of processors are virtualized into at least two virtual processing cores isolated from each other in time based on real hardware;

the virtual processing cores run the operating systems, respectively; and the inter-core communication circuit is an inter-core communication circuit based on virtualization.

3. The system according to claim 1, wherein:

the plurality of processors include at least two real processing cores isolated from each other in space;

the real processing cores run the operating systems, respectively; and the inter-core communication circuit is an inter-core communication circuit based on a multi-core structure.

4. The system according to claim 1, wherein:

the processor of the one of the plurality of processor groups distributes the rendering task to the processors of the other processor groups of the plurality of processor groups through the inter-core communication circuit, to cause the plurality of processors of the plurality of processor groups to perform the rendering synchronously.

5. A rendering method based on a system-on-chip (SOC) platform comprising:

determining whether a plurality of processors are needed to perform rendering collaboratively, the plurality of processors being divided into a plurality of processor groups, and a plurality of operating systems being run by the plurality of processor groups, respectively, different processor groups in the plurality of processor groups not sharing an operating system;

determining a plurality of graphics processors that perform the rendering collaboratively through an inter-core communication, the plurality of graphics processors being in a one-to-one correspondence with the plurality of processor groups; and integrating a result after the collaborative rendering and outputting the result, wherein determining whether the plurality of processors are needed to perform the rendering collaboratively further includes:

determining, by a processor of one of the plurality of processor groups, whether processors of other processor groups of the plurality of processor groups are needed to perform the rendering collaboratively, whether the one of the plurality of processor groups performs a rendering task or the plurality of processor groups perform the rendering task collaboratively being determined according to complexity of a scenario of the rendering task, and wherein determining the plurality of graphics processors that perform the rendering collaboratively through the inter-core communication further includes:

in response to determining that the collaborative rendering is needed, notifying the processors of the other processor groups of the plurality of processor groups through the inter-core communication, otherwise a graphics processor corresponding to the one of the plurality of processor groups performs the rendering alone;

determining, by the other processor groups, whether a graphics processor corresponding to one of the other processor groups is available; and in response to determining that the graphics processor corresponding to the one of the other processor groups is available, performing the collaborative rendering by the graphics processor corresponding to the one of the plurality of processor groups and the graphics processor corresponding to the one of the other processor groups, otherwise the graphics processor corresponding to the one of the plurality of processor groups performs the rendering alone.

6. The method according to claim 5, wherein in the collaborative rendering, synchronization of the graphics processor corresponding to the one of the plurality of processor groups and the graphics processor corresponding to the one of the other processor groups is ensured through the inter-core communication.

7. The method according to claim 6, wherein integrating the result after the collaborative rendering and outputting the result further includes:

after the collaborative rendering, notifying, by the other processor groups, the one of the plurality of processor groups; and completing the rendering by the one of the plurality of processor groups and outputting the rendering result.

8. A non-transitory computer-readable storage medium stores a computer instruction and, when the computer instruction is executed, a processor is caused to:

determine whether a plurality of processors are needed to perform rendering collaboratively, the plurality of processors being divided into a plurality of processor groups, and a plurality of operating systems being run by the plurality of processor groups, respectively, different processor groups in the plurality of processor groups not sharing an operating system;

determine a plurality of graphics processors that perform the rendering collaboratively through an inter-core communication, the plurality of graphics processors being in a one-to-one correspondence with the plurality of processor groups; and integrate a result after the collaborative rendering and outputting the result, wherein determining whether the plurality of processors are needed to perform the rendering collaboratively further includes:

determining, by a processor of one of the plurality of processor groups, whether processors of other processor groups of the plurality of processor groups are needed to perform the rendering collaboratively, whether the one of the plurality of processor groups performs a rendering task or the plurality of processor groups perform the rendering task collaboratively being determined according to complexity of a scenario of the rendering task, and wherein determining the plurality of graphics processors that perform the rendering collaboratively through the inter-core communication further includes:

in response to determining that the collaborative rendering is needed, notifying the processors of the other processor groups of the plurality of processor groups through the inter-core communication, otherwise a graphics processor corresponding to the one of the plurality of processor groups performs the rendering alone;

determining, by the other processor groups, whether a graphics processor corresponding to one of the other processor groups is available; and in response to determining that the graphics processor corresponding to the one of the other processor groups is available, performing the collaborative rendering by the graphics processor corresponding to the one of the plurality of processor groups and the graphics processor corresponding to the one of the other processor groups, otherwise the graphics processor corresponding to the one of the plurality of processor groups performs the rendering alone.

9. The storage medium according to claim 8, wherein in the collaborative rendering, synchronization of the graphics processor corresponding to the one of the plurality of processor groups and the graphics processor corresponding to the one of the other processor groups is ensured through the inter-core communication.

10. The storage medium according to claim 9, wherein the processor is further configured to:

after the collaborative rendering, notify, by the other processor groups, the one of the plurality of processor groups; and complete the rendering by the one of the plurality of processor groups and outputting the rendering result.

* * * * *